United States Patent [19]
Blanchet et al.

[11] Patent Number: 5,804,147
[45] Date of Patent: Sep. 8, 1998

[54] EXHAUST GAS MANAGEMENT APPARATUS AND METHOD

[75] Inventors: Scott Christopher Blanchet, Imlay City; Wayne Richard Moore, Goodrich; Russell Paul Richmond, Clifford; Michael Ralph Foster, Columbiaville, all of Mich.

[73] Assignee: General Motors Corporation, Detroit, Mich.

[21] Appl. No.: 885,968

[22] Filed: Jun. 30, 1997

Related U.S. Application Data

[63] Continuation-in-part of Ser. No. 797,545, Feb. 3, 1997, Pat. No. 5,766,559.

[51] Int. Cl.$^6$ .............................. B01D 53/34; F01N 3/28
[52] U.S. Cl. .................... 422/171; 422/169; 422/170; 422/172; 422/177; 422/180; 60/289; 60/293; 60/299
[58] Field of Search ................. 422/179, 169–171, 422/176, 172, 177, 180–181, 174; 60/284–285, 297, 299, 293, 289, 288, 287; 428/116, 592–594; 502/493, 527; 29/890

[56] References Cited

U.S. PATENT DOCUMENTS

| | | | |
|---|---|---|---|
| 3,662,540 | 5/1972 | Murphey | 422/171 |
| 3,852,041 | 12/1974 | Moore et al. | 60/299 |
| 4,239,733 | 12/1980 | Foster et al. | 422/179 |
| 4,830,833 | 5/1989 | Shaff | 422/181 |
| 4,886,711 | 12/1989 | Foldvary | 428/592 |
| 5,125,231 | 6/1992 | Pahl et al. | 422/171 |
| 5,187,142 | 2/1993 | Richmond et al. | 502/439 |
| 5,315,824 | 5/1994 | Takeshima | 60/297 |
| 5,330,728 | 7/1994 | Foster | 422/177 |
| 5,525,308 | 6/1996 | Oser | 422/171 |
| 5,575,980 | 11/1996 | Turek | 422/181 |
| 5,693,294 | 12/1997 | Anderson et al. | 422/171 |

FOREIGN PATENT DOCUMENTS

| | | |
|---|---|---|
| 697 505 A1 | 2/1996 | European Pat. Off. . |
| 0 763 561 A1 | 3/1997 | European Pat. Off. . |

OTHER PUBLICATIONS

*Radial Inflow Catalytic Converter More Efficient,* Ward's Engine and Vehicle Technology Update, Jun. 15, 1994, p. 7.

*In–Line Hydrocarbon Absorber System for ULEV,* M.D. Patil, W. Hertl, J. L. Williams and J. N. Nagel; SAE Technical Paper Series #960348, International Congress, *Exposition; Detroit, MI; Feb. 26–29, 1996.

*Primary Examiner*—Hien Tran
*Attorney, Agent, or Firm*—Anthony Luke Simon

[57] ABSTRACT

An exhaust gas management apparatus including: a first substrate coated with an oxidizing catalyst, wherein the first substrate includes an axial opening and a body portion radially exterior of the axial opening, wherein the axial opening comprises at least part of a bypass passage; an air source located downstream in an exhaust flow path of the axial opening; an air pump unit responsive to a control signal forcing air through the air source wherein, during an activation of the pump unit, the bypass passage is valved shut; and a second substrate coated with an oxidizing catalyst located in the path of exhaust downstream of the first substrate.

15 Claims, 10 Drawing Sheets

EXHAUST GAS MANAGEMENT APPARATUS AND METHOD

This application is a continuation-in-part of pending U.S. patent application, Ser. No. 08/797,545, filed Feb. 3, 1997, issued as U.S. Pat. No. 5,766,559, and assigned to the assignee of this invention.

This invention relates to an exhaust gas management apparatus and method.

BACKGROUND OF THE INVENTION

It is known to use a catalytic converter in the exhaust gas flow path of a motor vehicle internal combustion engine. The catalytic converter includes a substrate with a coating of a catalyst material of a known type for stimulating the oxidation of hydrocarbon molecules and carbon monoxide molecules flowing in the vehicle exhaust gas. The catalyst operates on the exhaust gases when the catalyst is above a minimum temperature, referred to as a light-off temperature. When below the light-off temperature, the catalyst does not stimulate the desired oxidation.

When a vehicle engine is first started after the vehicle has been left without the engine running for several hours and the catalyst within the catalytic converter has had sufficient time to cool down to the ambient air temperature, there is a time period after vehicle start-up and before the catalytic converter catalyst reaches the light-off temperature during which the catalytic converter is not active. One suggested method for operating on exhaust gas during the time period before the catalytic converter becomes active is to use a second catalyst-coated substrate, referred to as a fast light off substrate, upstream of the conventional catalytic converter substrate. For example, the fast light off substrate can be placed in close proximity to the engine so that it heats up faster than the conventional catalytic converter catalyst and operates on exhaust gases during the time period prior to the conventional catalytic converter catalyst reaching light off temperature. Once the conventional catalytic converter catalyst reaches light off temperature, the exhaust gases are valved to bypass the fast light-off catalyst and are operated on by the conventional catalyst. This bypassing preserves the fast light off catalyst from poisoning or other aging that would be detrimental to its performance.

It is also known to use a hydrocarbon absorber between two catalyst substrates in the catalytic converter. The hydrocarbon adsorber is provided with a bypass passage such as a central opening through the surrounding monolith structure. The bypass passage does not significantly affect gas passing therethrough while the monolith structure surrounding the bypass passage contains material that adsorbs hydrocarbons from exhaust gases as long as the monolith is below a predetermined temperature.

In operation, the bypass passage is valved shut by an air valve immediately after vehicle start up, forcing exhaust gases to travel through the hydrocarbon adsorbing monolith structure of the adsorber. The adsorber adsorbs hydrocarbons from the exhaust gas passing through the monolith. When the catalyst substrate upstream of the adsorber reaches light-off temperature and begins the desired catalytic activity on the exhaust gases, the air valve is opened and the engine exhaust gas is allowed to bypass the hydrocarbon adsorbing monolith by flowing through the bypass passage. The exhaust gas continues heating the catalyst substrate downstream of the hydrocarbon adsorber to light off temperature.

When the hydrocarbon adsorber reaches a temperature at which it releases hydrocarbons stored therein, those hydrocarbons are ideally oxidized in the downstream converter into more desired species of exhaust gas. If necessary, supplemental air is provided by the air valve to allow appropriate oxidation of the hydrocarbons passing through the second catalyst substrate. It has been suggested to control the air flow into the air valve in the adsorber so that as engine speed increases, air to the air valve decreases, allowing more exhaust gases to bypass the adsorber, i.e., through a central opening to more quickly heat up the second catalyst substrate. This control strategy, however, fails to optimize performance of the catalytic converter because it allows hydrocarbons to bypass the adsorber before the first catalyst substrate reaches light off temperature.

SUMMARY OF THE INVENTION

It is an object of this invention to provide an exhaust gas management apparatus.

Advantageously, this invention provides an exhaust gas management apparatus including a fast light off catalytic converter catalyst substrate with an axial bypass opening with bypass flow controlled by an air valve.

Advantageously, this invention provides an exhaust gas management apparatus including a fast light off catalytic converter catalyst substrate with an axial bypass opening that provides more efficient flow of exhaust gases through the bypass opening.

Advantageously, this invention provides an exhaust gas management apparatus and method, including upstream and downstream catalyst coated substrates with an improved bypass passage in the upstream catalyst coated substrate that allows more efficient implementation of an air valve for controlling flow through the upstream substrate, thus allowing full control of air flow through the upstream catalyst coated substrate while reducing the amount of air necessary to be pumped through the air valve.

Advantageously, this invention provides an exhaust gas management apparatus that provides new air flow control for the upstream catalyst catalytic converter catalyst to maximize efficiency of the upstream catalyst in the exhaust flow management apparatus.

Advantageously, according to a preferred example, this invention provides an exhaust gas management apparatus comprising: a first substrate coated with an oxidizing catalyst, wherein the first substrate includes an axial opening and a body portion radially exterior of the axial opening, wherein the axial opening comprises at least part of a bypass passage; an air source located downstream in an exhaust flow path of the axial opening; an air pump unit responsive to a control signal forcing air through the air source wherein, during an activation of the pump unit, the bypass passage is valved shut; and a second substrate coated with an oxidizing catalyst located in the path of exhaust downstream of the first substrate.

According to a preferred example, the first and second substrates are located in a common housing.

Advantageously, according to another preferred example, the exhaust gas management apparatus also includes an electronic control unit coupled to at the air pump unit wherein the electronic control unit provides the output signal controlling the air pump unit wherein the electronic control unit selectively controls the air pump unit between first, second, third and fourth states wherein in the first state the bypass passage is valved shut; in the second state the bypass passage is valved shut and secondary air from the air source is forced upstream through the bypass passage and through the body portion of the first substrate; in the third state, the bypass passage is valved open and air from the air source flows to a second substrate coated with an oxidizing catalyst located downstream in the exhaust flow path of the first substrate and in the fourth state no air exits the air source.

BRIEF DESCRIPTION OF THE DRAWINGS

The present invention will now be described by way of example with reference to the following drawings in which.

DESCRIPTION OF THE PREFERRED EMBODIMENT

Figure 1:
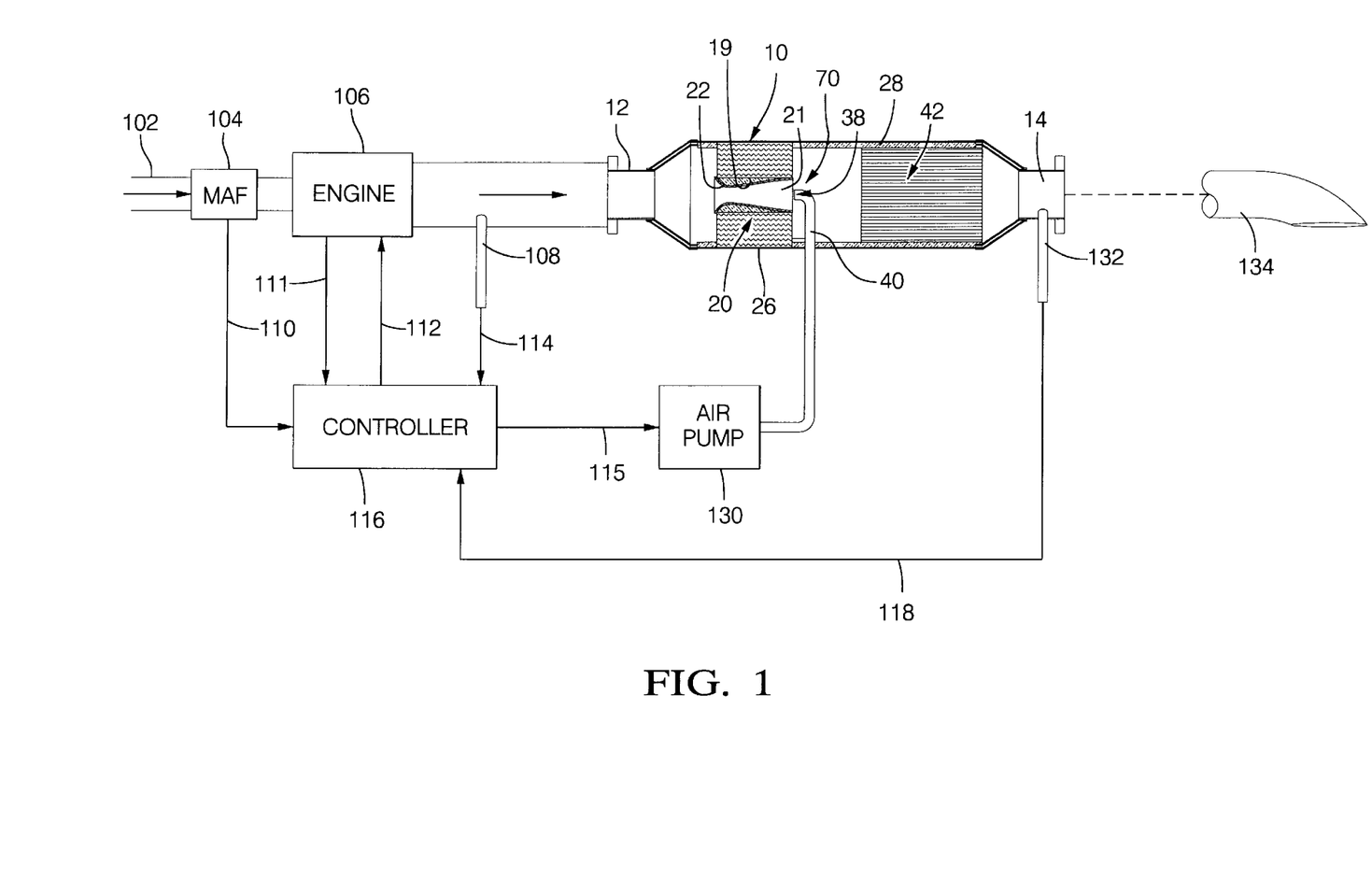
FIG. 1 illustrates schematically an example exhaust gas management apparatus according to this invention.

Referring now to FIG. 1, catalytic converter 10 has an inlet 12 in which exhaust gas flows from a vehicle engine and exhaust manifold. In the catalytic converter 10, the exhaust gas flows through the first substrate 20 and then through the second substrate 42. Substrates 20 and 42 are both coated in a known manner with an oxidizing catalyst (which, as used herein, may include three way catalysts). The substrates 20 and 42 are maintained in place within the catalytic converter housing 26 by a known substrate retention material 28. An air valve 70 is shown in connection with the substrate 20 and includes air source pipe 40, air pump unit 130 and air flow directing body 22. Open end 38 of air source pipe 40 is the air source for the air valve for controllably closing and opening the bypass passage 21, which is formed by air flow directing body 22 located radially within the outer walls of the flow passage 19 and extending completely through the substrate 20 in the axial direction.

The air flow pipe 40 is sealingly mounted within an opening in the catalytic converter housing 26. For example, the pipe 40 may be welded in place by a circumferential weld that seals the interface between the housing 26 and the pipe 40. The open end 38 is located between substrate 20 and substrate 42 and is pointed upstream into the bypass passage 21. Insulation 31 (see FIG. 2) may be placed between the air flow directing body 22 and the wall of passage 19, minimizing the transfer of heat to the catalyst substrate 20 from the gases flowing through the bypass passage 21.

During engine operation, ambient air flows through intake ducts 102, past mass air flow sensor 104 and into the engine 106. The mass air flow sensor 104 provides a signal on line 110 to controller 116 to indicate the amount of mass air flow into the engine 106. In response to the signal on line 110 and other known signals, controller 116 provides commands through line 112 to the engine 106 to control fueling and other operations of the engine 106 in a known manner of engine control. Exhaust gas out of engine 106 passes a first oxygen sensor 108 of a known type that provides a signal on line 114 to the controller 116. The exhaust gasses then flow into the catalytic converter 10, which performs the desired catalyzing functions. The exhaust gasses flowing though the outlet 14 of the catalytic converter 10 eventually exit the vehicle via the exhaust gas tail pipe 134. Oxygen sensor 132 measures the oxygen content of the exhaust gasses exiting the catalytic converter 10 and provides a signal indicative thereof through line 118 to the controller 116. In response to the signals on lines 110, 114 and 118, the controller 116 controls the air pump 130 through control signals on line 115 to control the flow of ambient air through the tube 40, out of the open end 38 located within the catalytic converter 10.

In general, the air pump 130 is controlled as follows. Immediately upon start-up of the vehicle, valve 70 is closed by activation of the air pump 130 through control signals on line 115 in response to signals on line 110 indicating the mass air flow into the engine 106. The flow rate through the pump 130 is continually updated to maintain the bypass channel 21 of the substrate 20 closed until the catalyst coating of substrate 42 reaches light off temperature. While valve 70 is closed, the catalyst coating on the first substrate 20 quickly reaches light-off temperature and begins catalytic operation on the exhaust gasses. To achieve the quick light-off, the first substrate 20 may incorporate one or more of the following properties: the structure of the substrate 20 may have a low thermal mass, i.e., the substrate may have a thin wall ceramic structure or may comprise a ceramic or metal foam; and the substrate may be coated with a catalyst that reaches light-off at a temperature lower than the light-off temperature of the catalyst coating substrate 42.

As the speed of engine 106 changes, affecting the mass air flow into the engine, and as the fuel command to the engine changes, affecting the exhaust gas mass flow, the rate of air exiting pump 130 into the catalytic converter 10 is continually updated to maintain the bypass channel 21 closed. If the controller determines that a fuel rich condition in the exhaust gases exists, the controller may command that additional air, referred to as secondary or supplemental air, be pumped through tube 40. The supplemental air exits the end 38, flows upstream through the passage 21, and mixes with the exhaust gasses entering the substrate 20 to return the gas mixture to stoichiometry.

When catalyst 42 reaches light-off temperature, the valve 70 is opened by control signals on line 115 commanding that the air pump 130 reduce or eliminate the supply of air being forced through tube 40 so that bypass channel 21 is no longer blocked by the air exiting source 38. When valve 70 is valved open, exhaust gasses bypass the catalyst portion of substrate 20 by flowing through the bypass passage 21 and flow to catalyst substrate 42, which performs the desired catalyst functions on the exhaust gasses. By directing the exhaust gasses through the bypass channel 21 after the substrate 42 has reached light-off temperature, the body of the substrate 20 is preserved for use only when the valve 70 is valved closed, minimizing the potential for poisoning and coke build-up on the catalyst coating the substrate 20, ensuring a longer life for the catalyst coating substrate 20.

If the controller 116 determines that a fuel rich condition exists in the exhaust gases, then it commands pump 130 to introduce secondary air into the exhaust gasses flowing through the bypass passage 21. When the valve 70 is valved open, the secondary air flowing through tube 40 is not of sufficient amount to force the bypass channel 21 closed.

Figure 2:
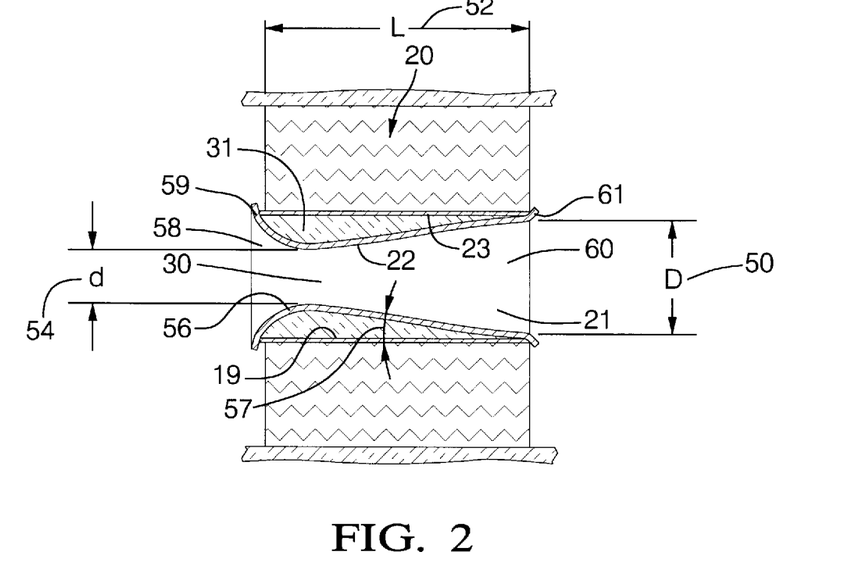
FIG. 2 illustrates an enlarged view of a portion of FIG. 1.

Referring now to FIG. 2, the shape of the air flow directing body 22 can be better understood. The air flow directing body 22 has an inlet end 58 and an outlet end 60 and therebetween defines a low pressure region 30 where the diameter 54 of the bypass passage 21 is its minimum size, smaller than the diameter 50 at the inlet end 58 and outlet end 60.

The structure of the substrate 20 may be achieved by forming a tubular air flow directing body 22 having longitudinal cross section, as shown, and then wrapping a metal monolith catalytic converter substrate around the body 22. The ends 59 and 61 of the body 22 may be flared out as shown to prevent the substrate 20 from moving with respect to the air flow directing body 22. In the example shown in FIG. 2, a second tube 23 having a circular cylindrical shape of constant diameter is provided annularly around the air flow directing body 22. The flared ends 59 and 61 prevent telescoping of the tube 23 with respect to the body 22.

In another example, the substrate 20 may be an extruded ceramic substrate with the passage 19 formed during the extrusion process or, alternatively, later cored from the substrate through a machine operation. Alternative substrates of metal or ceramic foam may also be used. In the examples where the substrate 20 is pre-formed, such as when the substrate is extruded ceramic or foam, the substrate is slid into place around the outer or second tube 23 prior to the formation of the flared end 61.

The shape of the air flow directing body 22 and the relative sizes of the diameters 54 and 50 and the diameter of the open end 38 of the air source tube or pipe 40 are preferably provided so that the following relations hold true.

$d_{LP} = D_n + x*L/8$, where $0.51 \leq x \leq 2$; and $D_{end} = 2*L*\tan(\theta) + d_{LP}$, where $0° \leq \theta \leq 15°$, where $d_{LP}$ is the diameter 54 at the low pressure region of the bypass channel, $D_{end}$ is the maximum diameter 50 of the bypass channel, $D_n$ is the diameter of the opening of the end 38 at the air source pipe 40 and L is the overall length 52 of the bypass passage 21 and $\theta$ is the half angle 57 of the diffuser portion of the air flow directing body 22.

Figure 3:
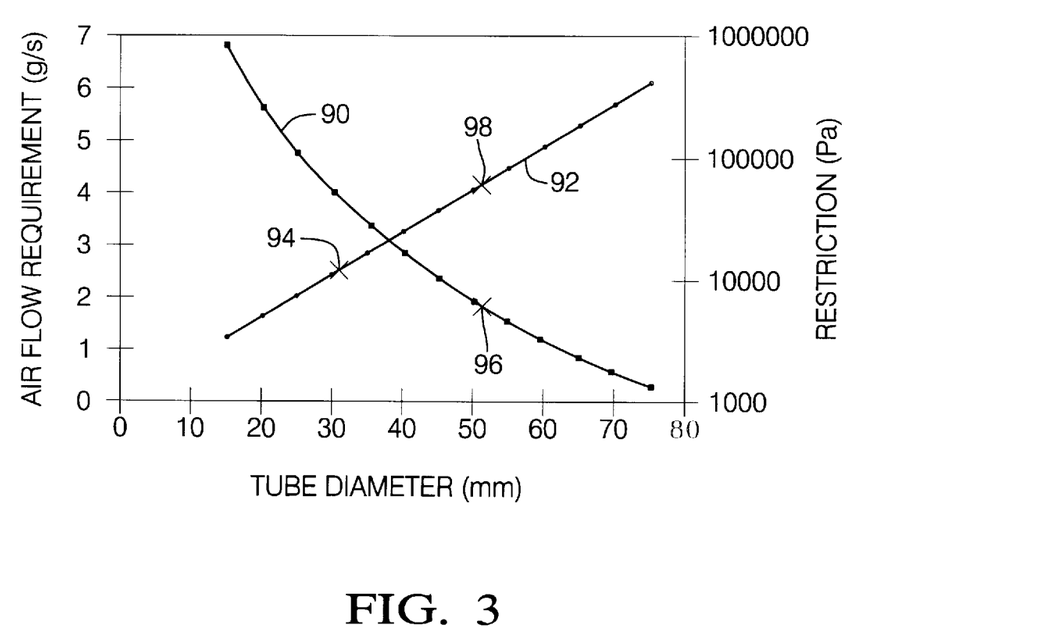
FIG. 3 illustrates an example graph of advantages according to this invention.

Referring now to FIG. 3, advantages of an example bypass channel 21 are illustrated. The trace 90 in the graph represents the restriction of a straight tube bypass channel in relation to tube diameter for an example flow rate of 125 g/s of exhaust gases at 800° C. Trace 90 illustrates that, as the tube diameter increases, the restriction to gas flow decreases. Trace 92 represents the necessary rate of air flow forced through the end 38 of the air source pipe 40 to effectively valve close a bypass tube of constant diameter and force the gas to flow through the surrounding monolith having a 250 Pa restriction. Trace 92 illustrates that as the diameter of the straight bypass tube increases, more air flow from the air source is required to valve closed the tube.

References 96 and 98 illustrate that for a straight bypass tube diameter of 50 mm, which provides a suitably low flow restriction, the air source 38 must provide air flow at a rate of 4 g/s to valve shut the bypass tube to force the gas to flow through the surrounding monolith having a 250 Pa restriction. However, using the air flow directing body 22 shown in FIGS. 1 and 2 with a minimum diameter 54 of 32 mm and with the end 38 of the air source pipe 40 aimed at the low pressure region 30, the low restriction indicated by reference 96, when the valve is opened, is maintained while the air flow rate required by the air source 30 to valve shut the bypass passage is reduced significantly to about 2.6 g/s (reference 94). This represents approximately a 40 percent reduction in air flow required to valve shut the bypass passage without any increase in the flow restriction to the exhaust gases flowing through the bypass when the bypass is valved open.

As can be seen, substantial advantage is provided by the air flow directing body 22, allowing use of a lower capacity air pump to effectively valve shut the bypass passage while not increasing the restriction to exhaust gases through the catalytic converter.

Figure 4:
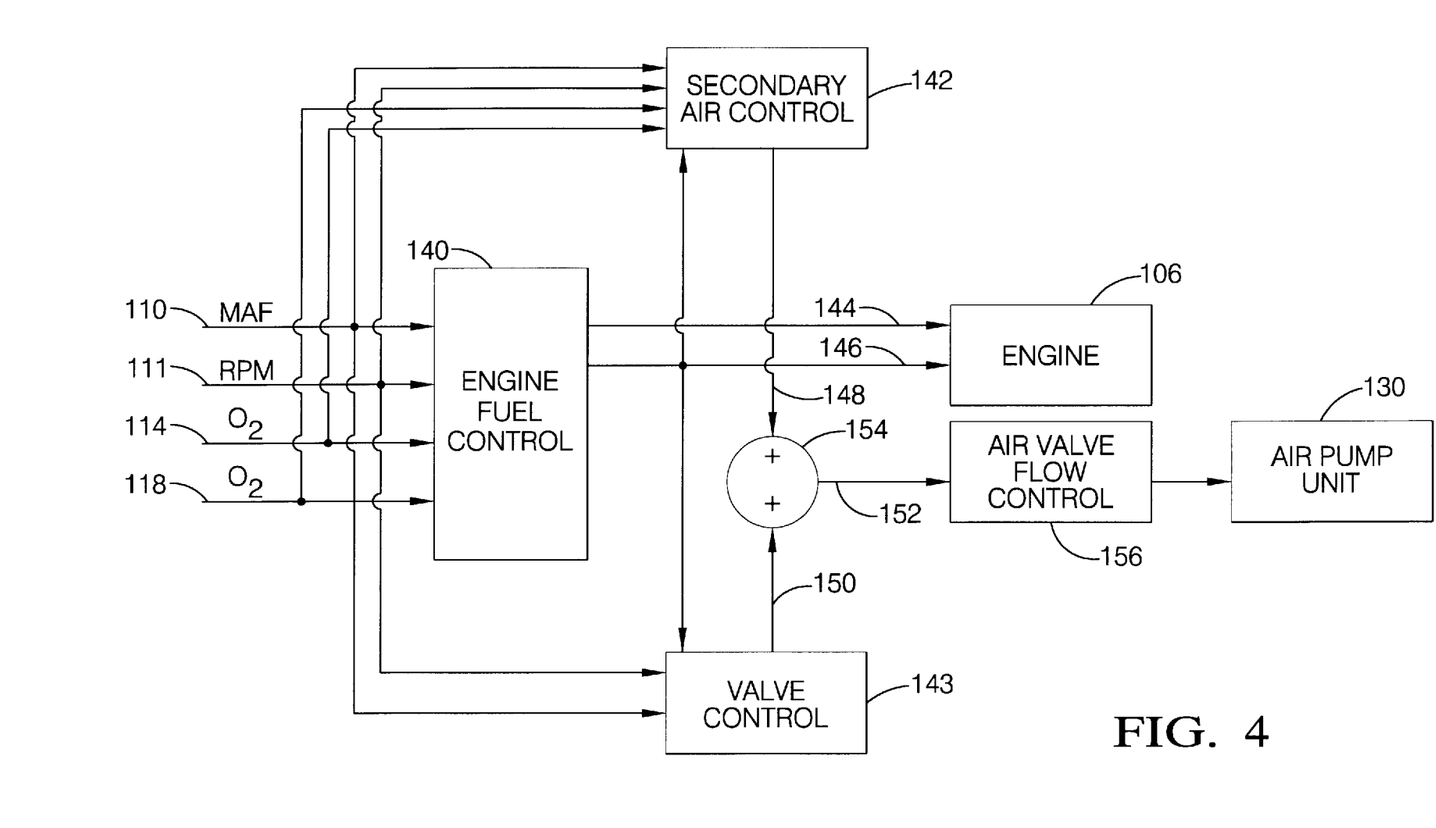
FIG. 4 illustrates an example control according to this invention.

Referring now to FIG. 4, according to the example control shown, input signals such as engine intake mass air flow, engine speed and the oxygen sensor output signals on lines 110, 111, 114 and 118, respectively, are provided to the engine control block 140 comprising a known control structure for providing fuel command signals and spark control signals on lines 146 and 144, respectively, to the engine 106. The signals on lines 110, 111, 114 and 118 and the fuel signal on line 146 are also provided to the secondary air control 142, which implements a control of a known type to generate a secondary air control signal on line 148.

In general, secondary or supplemental air is used in a known technique to add air to the exhaust gas stream flowing out of the internal combustion engine when, in response to the measured engine states and the fuel command, it is expected that a fuel rich condition will occur in the engine exhaust. In such fuel rich conditions, the secondary air is used to return the mixture of gases in the exhaust stream to a stoichiometric ratio.

The mass air flow signal on line 110 and the fuel signal on line 146 are also used by block 143 to generate the air valve control command. In general, the amount of air necessary to be pumped through tube 40 to valve closed the air valve is related to the mass flow of the exhaust gas stream. The mass flow of the exhaust gas stream can be computed from the engine intake mass air flow signal on line 110 and the fuel signal on line 146 using a standard conversion table that, in a known manner, takes into account the combustion efficiency of the engine 106. From the signals on lines 110 and 146 then, block 143 generates a control command on line 150, commanding the amount of air to be forced through the tube 40 to valve closed the air valve.

Control block 143 may be implemented as a look-up table function responsive to the signals on lines 110 and 146 and, if desired, may also be calibrated in response to the engine speed signal on line 111 to generate the command signal on line 150. One skilled in the art can easily generate the data for the table at block 143 on a test vehicle by running the vehicle engine at various conditions, modifying the air command for the air valve to achieve an air valve command that closes the air valve for the corresponding conditions and programming the command into the command table at the positions corresponding to the mass air flow, fuel command and engine speed, if used. By repeating this process at various engine operating conditions, the command table for block 143 can be generated.

Block 154 sums the air valve command on line 150 and the secondary air command on line 148 and provides a summation result on line 152 to block 156, which generates an appropriate actuator command for the air pump unit 130 to achieve the desired air flow as indicated by line 152. If the air pump unit is of a type where air flow through the tube 40 is controlled by a solenoid valve, then the command provided by block 156 is preferably a pulse width modulated signal whose duty cycle is varied in response to the commanded air flow. If the air pump unit 130 is of a type where air flow through the tube 40 is controlled directly by varying the output of the pump motor, then the command provided by block 156 may be any suitable type of motor control command.

While the system in FIG. 4 shows an open loop control, closed loop control may be implemented to provide accurate feedback of actual air pumped through the tube 40. The closed loop control may include measuring or estimating the air through the air tube 40 and using the measured or estimated air as a feedback signal in a known PID, PD or other closed loop control scheme.

Figure 5:
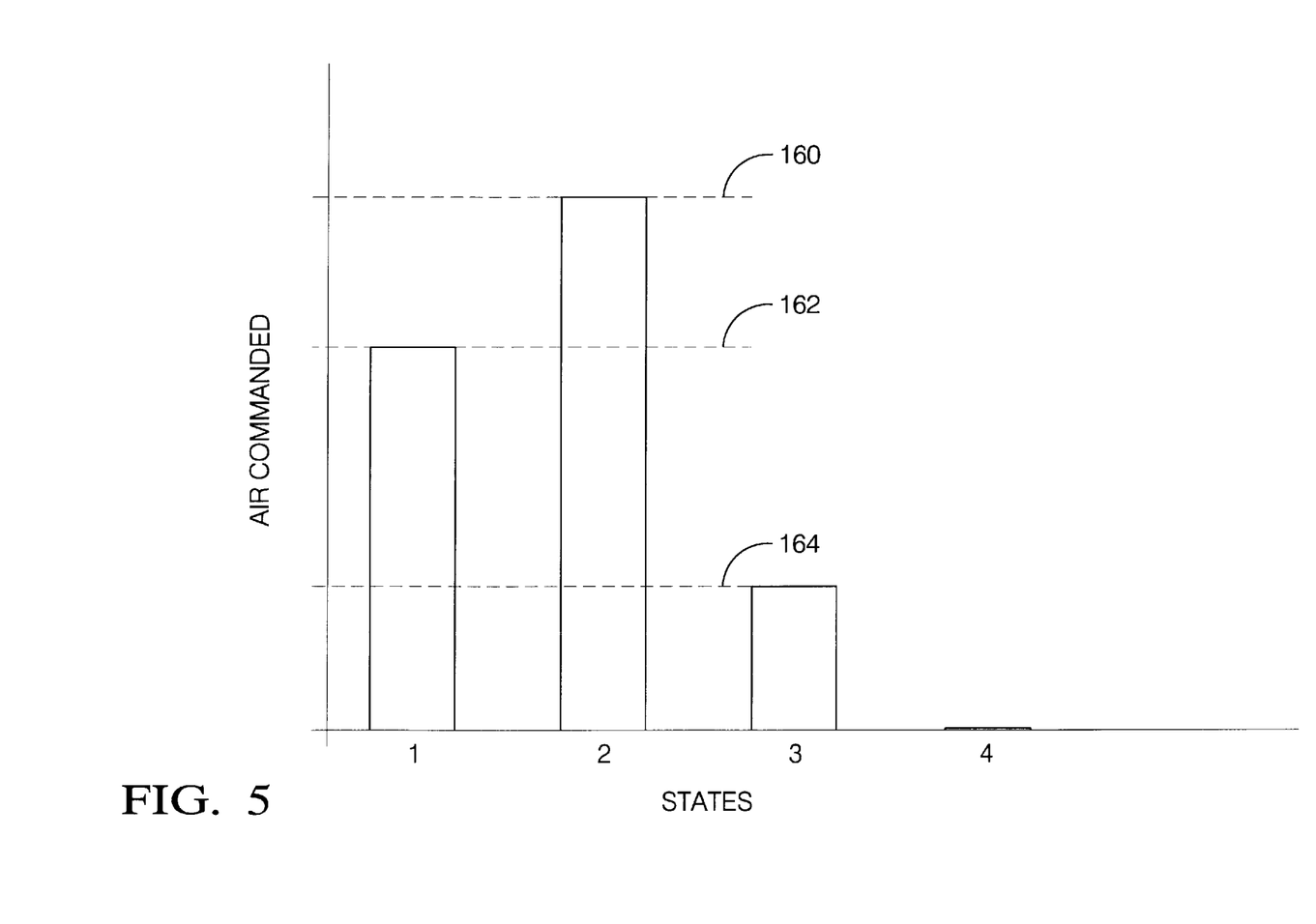
FIG. 5 illustrates example operating states of this invention.

Referring now also to FIG. 5, the control shown in FIG. 4 generates four general states for the commanded air through pipe 40. States 1 and 2 correspond to when the air valve is commanded closed and States 3 and 4 correspond to when the air valve is commanded open. The line denoted by reference 162 represents the amount of air necessary to valve closed the air valve (i.e., the signal on line 150 in FIG. 4) and it will be understood that, as described herein, the actual value of reference 162 will vary depending on vehicle operating conditions.

State 1 illustrates a condition where the air valve is desired to be valved closed but no supplemental air is desired for entry into the exhaust path upstream of substrate 20. State 2 represents a condition where the air valve is valved closed and, because a fuel rich condition is expected in the vehicle exhaust, secondary air is also commanded through the tube 40 to be introduced into the exhaust flow path upstream of the substrate 20. Thus, the line denoted by reference 160 represents an air command for the air valve commanding enough air to close the air valve and to also force secondary air upstream of the air valve to mix with exhaust gases flowing into the catalytic converter 10 and through the substrate 20. Thus, in State 2, the command represented by reference 160 is the sum of the valve closed command represented by line 162 and the secondary air command represented by the difference between lines 160 and 162.

In States 3 and 4, when the air valve is valved open, there is no valve command and thus the only command for air through tube 40 is for secondary air represented by reference 164. The secondary air represented by reference 164 flows out of the air source and downstream into the second catalyst substrate 42 to compensate for the fuel rich condition in the exhaust gas and bring total mixture of exhaust gases to stoichiometry. State 4 represents the condition when no air is commanded through tube 40.

Figure 6:
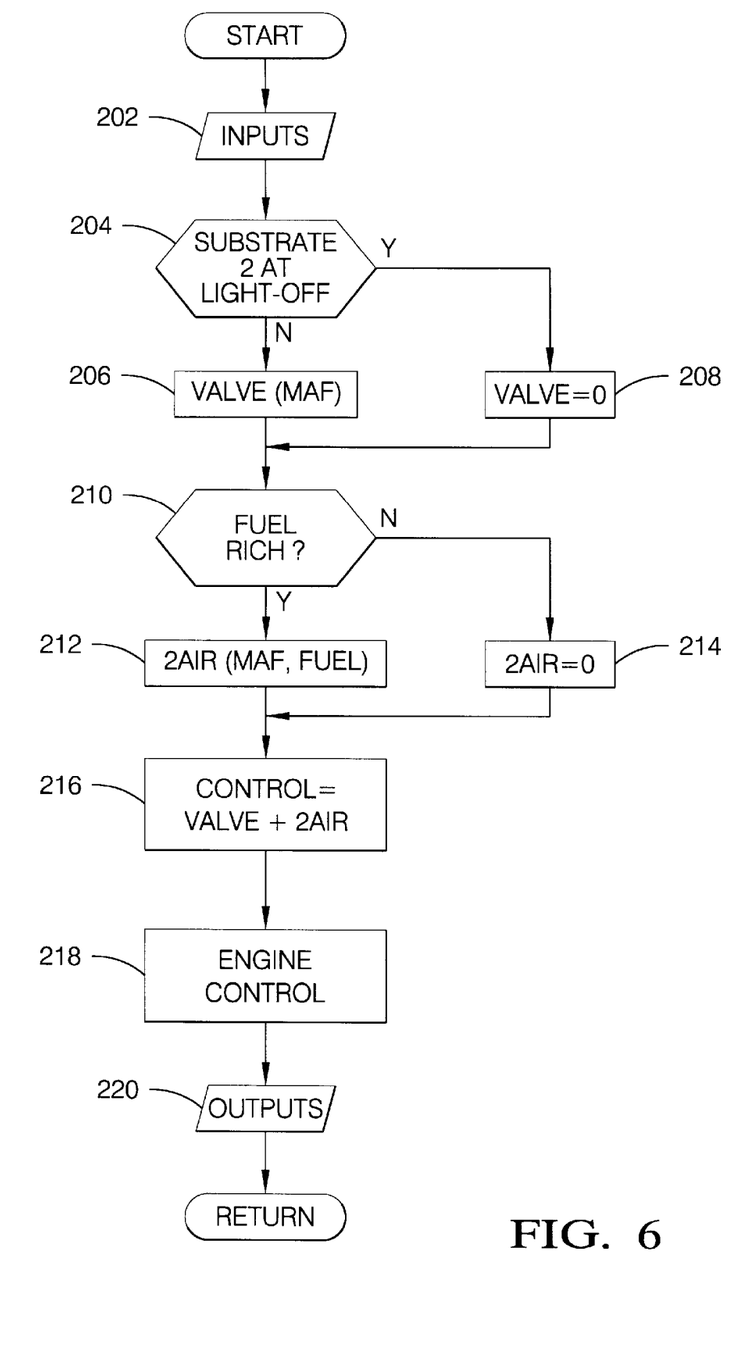
FIG. 6 illustrates example control steps performed by a controller 116 according to this invention.

Referring now to FIG. 6, a command flow diagram of an example control for generating the four states described above with reference to FIGS. 4 and 5 starts at block 202 where it receives the system inputs and then moves to block 204 where it determines whether or not the second substrate 42 has reached light off temperature. The determination of whether or not the substrate 42 has reached light off temperature may be done on a statistical basis using a timer programmed into the controller having a time out value corresponding to a statistically determined time period, after which a high confidence exists that the second substrate 42 has reached light off temperature. Other ways of determining whether the second substrate has reached light off temperature include using feedback from the downstream oxygen sensor 132 or directly measuring the temperature of the second substrate. If the second substrate 42 has reached light off temperature, then there is no need to valve closed the air valve in the first substrate and, thus, the valve command is set at block 208 to zero. If the second substrate has not reached light off temperature, then block 206 determines the valve command as a function at least of mass air flow and preferably of the fuel command and, if desired, engine speed.

Block 210 then determines, in a known manner of secondary air control, whether or not a fuel rich condition is expected in the vehicle exhaust gases. If not, the secondary air command is set at block 214 to zero. If a fuel rich condition is expected in the vehicle exhaust gases, then block 212 determines the secondary air command in a known manner responsive, for example, to the measured mass air flow and the engine fuel command. Block 216 then determines the control command corresponding to the command on line 152 in FIG. 4 as the sum of the valve command and the secondary air command.

At block 218, the controller performs a standard engine control algorithm of a type known to those skilled in the art and block 220 outputs the standard engine control commands to the engine 106 and the air control command to air pump unit 130. The air control command to the pump 130 thereby achieves both control of the air valve 70 and control of the secondary air flow for the upstream and the downstream substrates 20 or 42.

Figure 7:
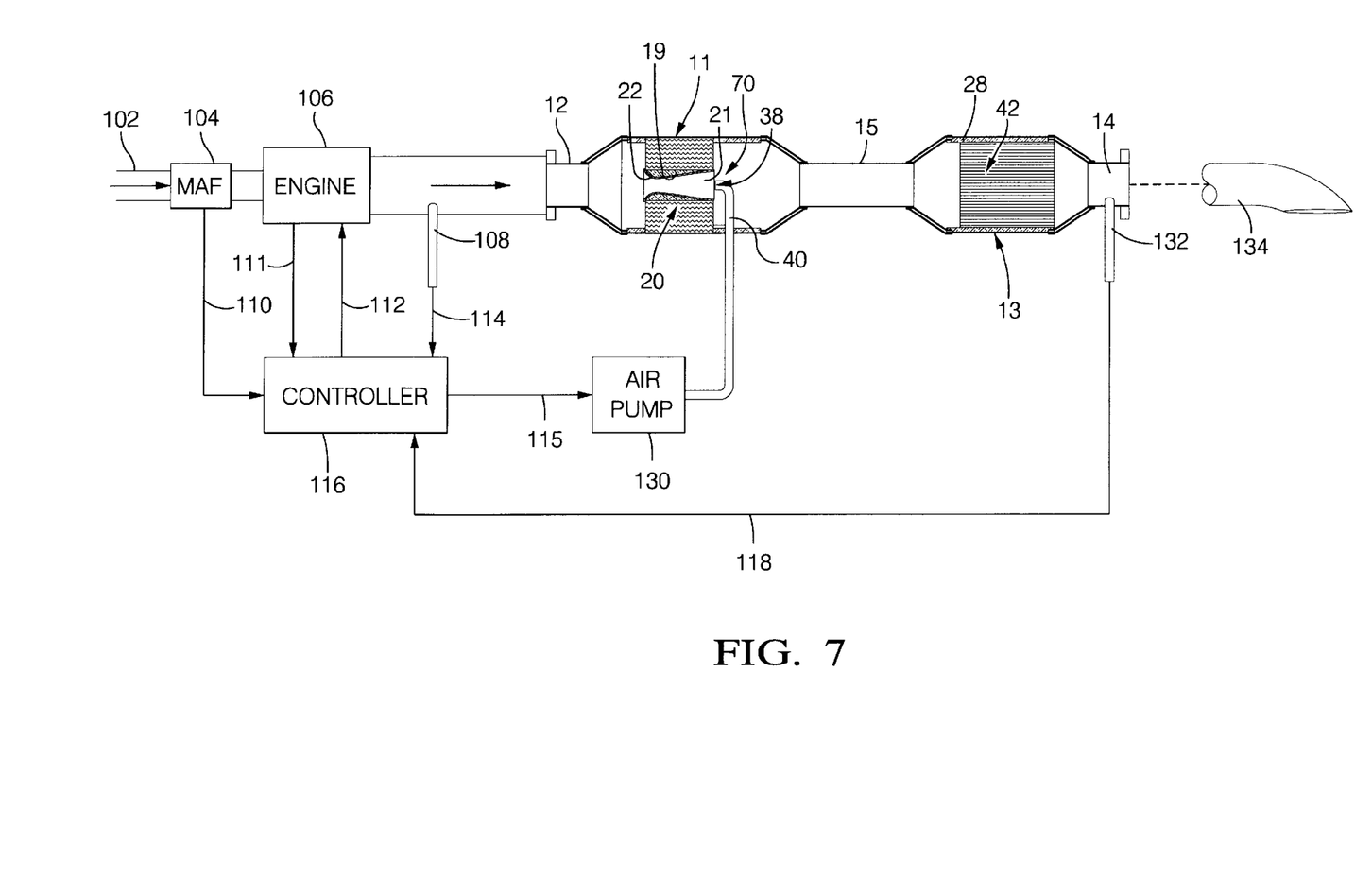
FIG. 7 illustrates schematically another example exhaust gas management apparatus according to this invention.

Referring now to FIG. 7, the system shown is similar to the system described above with reference to FIG. 1 except the catalytic converter 10 in FIG. 1 is replaced by first and second catalytic converters 11 and 13. The first substrate 20 with the air valve 70 is located in catalytic converter 11, which is positioned upstream of the catalytic converter 13. Exhaust flow pipe 15 provides the flow connection between the outlet of converter 11 and the inlet of converter 13. An advantage to the configuration shown in FIG. 7 is that the upstream catalytic converter 11 may be placed in close proximity to the vehicle engine 106 to further increase the speed in which the first catalyst substrate 20 reaches light off temperature and/or to obviate the need for a low temperature light-off catalyst. The control of the air pump unit 130 may be as described above with reference to FIGS. 4, 5 and 6.

Figure 8:
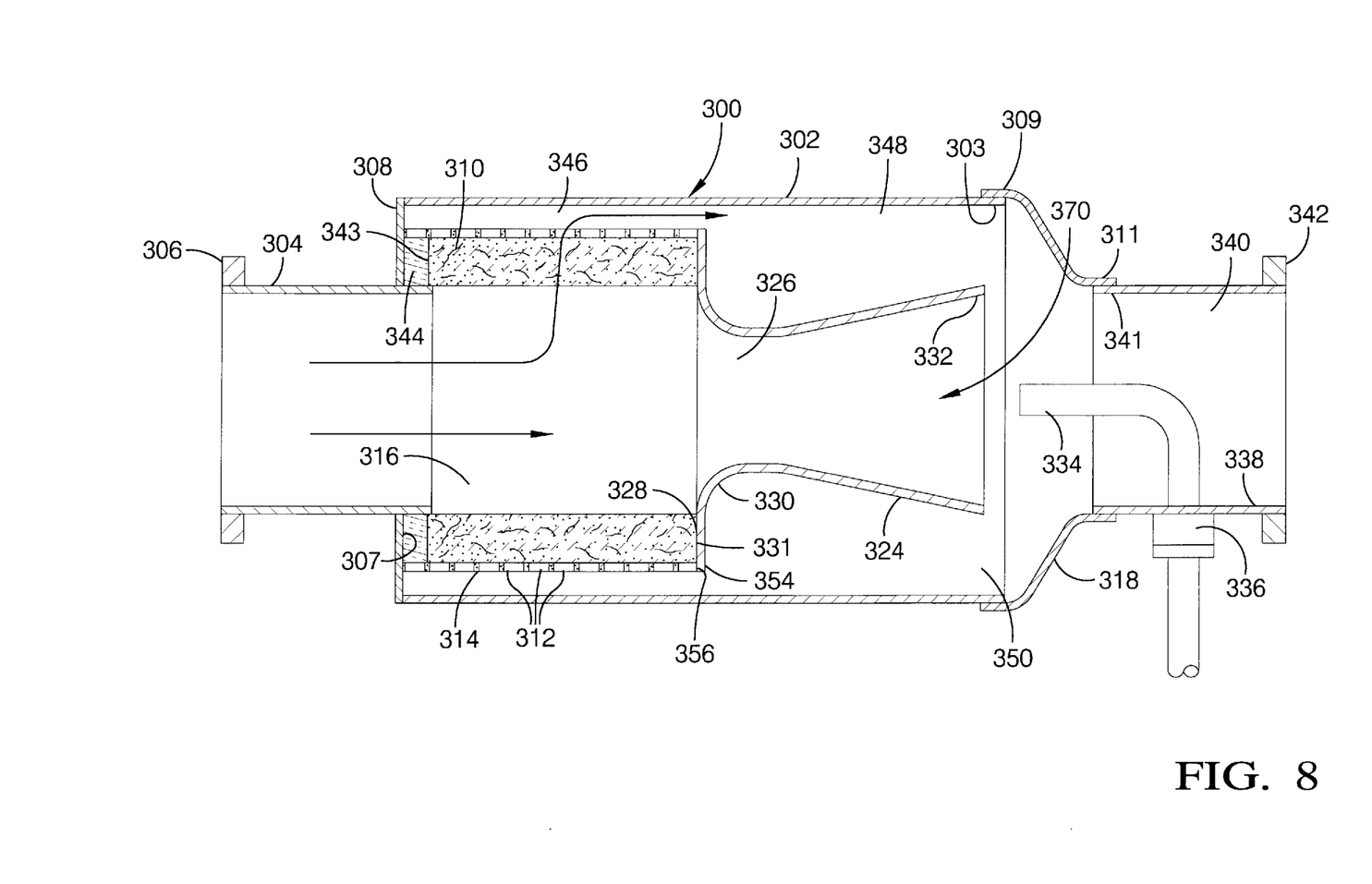
FIGS. 8, 9, 10 and 11 illustrate example apparatus according to this invention.

Referring now to FIG. 8, an example alternative structure for the upstream catalytic converter 11 in FIG. 7 is shown. The catalytic converter 300 includes an outer housing 302, an inlet end defined by mounting plate 306 and inlet tube 304 and an outlet end defined by mounting plate 342 and outlet tube 340. An annular housing end plate 308 has its radially outer periphery welded to the outer housing 302 and its radially inner periphery welded to the inlet tube 304. The welds are performed in a known manner to provide sealing engagement between the inlet tube 304 and the plate 308 and between the outer housing 302 and the plate 308. End cone 318 connects the outlet pipe 340 to the metal outer housing 302. The end cone 318 has a wide end 309 fitting over and welded to the exterior of the end 303 of the housing 302 and has a narrow end 311 welded to the exterior of end 341 of outlet pipe 340. Mounting plates 306 and 342 are mounted on the ends of the inlet and outlet tubes 304 and 340 for interconnecting the catalytic converter 300 into an exhaust flow path in a known manner.

Within the interior of the catalytic converter housing 302, a catalyst coated substrate 310 is held in place by perforated metal support 314 fitted around the circular cylindrical periphery of the substrate 310. The perforated metal support 314 has a plurality of holes 312, allowing escape of gas flowing through the substrate 310 in the radial direction. A matting material 344 is placed between the axial end 343 of the substrate 310 and the surface 307 of the end plate 308. The opposite axial end of 331 of the substrate 310 abuts the annular wall 328, which is formed as part of the air flow directing body 324.

The air flow directing body 324 has a cylindrical shape having a cross section as shown and may be formed from tubular steel. The outer periphery 354 of the radially extending annular wall 328 is welded to the axial end 356 of the perforated metal support 314. The opposite axial end of the perforated metal support 314 is welded to the end plate 308, thus supporting the entire structure including the substrate 310, the perforated metal support 314 and the air flow directing body 324.

The air flow directing body has a first end 330 that abuts the downstream axial end of the substrate 310 and a second end 332 at the exhaust flow exit of the air flow directing body. Between the ends 330 and 332, a low pressure region 326 is formed by a reduced diameter section of the air flow directing body 324. The radial interior of the air flow directing body 324 and the radial interior passage 316 of the substrate 310 together form the bypass flow passage for the converter 300 shown. An air flow tube 334 is located downstream of the low pressure region 326 and is pointed upstream into the low pressure region 326. The tube 334 passes through the wall 338 of the outlet tube 340 and is sealingly welded in place vis-à-vis plug 336, which sealingly engages the tube 334. The catalyst coated substrate 310 allows flow through the body portion in a radial direction. Such radially directed substrates can be fabricated a variety of ways, including using a series of metal foil plates, extruded ceramic and metal or ceramic foam.

The catalytic converter 300 shown operates in two primary modes. In the first mode, valve 370 formed by the air flow directing body 324 and the air flow tube 334 is valved open and exhaust gases flow from the inlet end 304 to the outlet end 340 through the bypass passage. In a second mode, the air forced through the outlet 334 expands to block the bypass passage at the low pressure region 326, valving closed the bypass passage. When valve 370 is valved closed, exhaust entering the catalytic converter 300 is forced radially from the interior passageway 316 of the substrate 310 through the substrate body to the radial exterior of the substrate 310, passing through the perforated plate 314 vis-à-vis the plurality of holes 312. The exhaust gas then enters the region 346 and proceeds downstream to the region 348 radially exterior of the air flow directing body. The exhaust gas passes around the end 332 of the air flow directing body 324 at the region 350 and exits the converter 300 through the outlet tube 340.

In a manner as described above with reference to FIGS. 4–6, when the bypass passage is valved closed, additional air can be forced through nozzle or air flow tube 334 to mix with exhaust gases expanding radially through the body of substrate 310 when secondary air is desired. When the bypass passage is valved open, secondary air may be forced through exit nozzle 334 in an amount insufficient to close bypass passage 326. The secondary air is then carried with the exhaust gasses directly to the downstream catalytic converter, such as catalytic converter 13 shown in FIG. 7.

Figure 9:
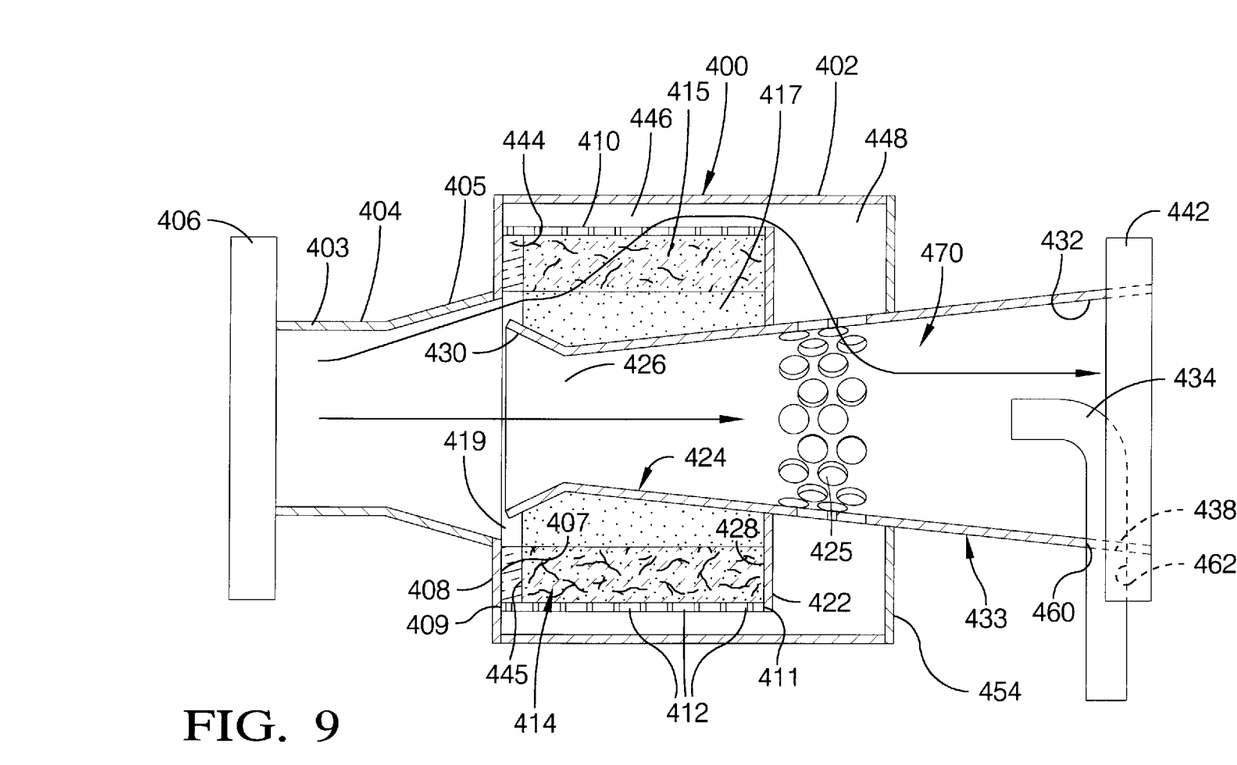

Referring now to FIG. 9, another example catalytic converter with an air flow valve is shown. The catalytic converter 400 includes the housing 402, inlet pipe 404 and outlet pipe 433, which in this case comprises part of the air flow directing body 424. The inlet pipe 404 is connected to a mounting bracket 406 at its inlet end and includes a substantially constant diameter circular cylindrical body portion 403 and a conically expanding portion 405. The outlet end of the conically expanding portion 405 is welded to the radially inner annular periphery of end plate 408, which has its radially outer annular periphery welded to the metal housing 402, which forms a circular cylindrical shape. A downstream end plate 454 is welded to the downstream end of the metal housing 402 at its radially outer periphery and is welded to the exterior periphery of the outlet tube at its radially inner periphery.

At the interior of housing 402, a cylindrical support 410 is formed of perforated metal and has a first end 409 welded to the interior surface 407 of the end plate 408 and has a second end 411 welded to the radially outer periphery of substrate end plate 422. Within the cylindrical support 410, substrate 414 abuts surface 428 of substrate end plate 422 and abuts matting material 444 between the end 445 substrate 414 and interior surface 407 of end plate 408. Or in the case of metal substrate, brazing directly to the end plate may be used to retain the metal substrate.

The substrate 414 has a body portion 415 and radially interior thereof a flow passage 417. A portion of the air flow directing body 424, including the low pressure region 426, is located within the flow passage 417 of substrate 414. Upstream of the low pressure region 426, the end 430 of the air flow directing body 424 radially expands and operates with the interior wall of portion 405 of inlet tube 404 to define two flow passages. The first flow passage extends through the radial interior of the air flow directing body 424, which is the bypass passage. Valve 470 is valved open allowing exhaust gas flow through the bypass passage when there is no air exiting air source 434 or the air exiting air source 434 is not sufficient to valve closed the bypass passage at the region 426.

The second flow passage at the end 430 of air flow directing body 424 is radially exterior of the expanding end 430 and radially interior of the conical portion 405 of inlet tube 404. The wall defining the conical portion 405 is preferably at an angle from the inlet flow axis no greater than the angle of the stall line for exhaust gas flow, i.e., no greater than approximately 15 degrees (or less, depending upon the system characteristics) from the inlet flow axis. When the air valve 470 is valved closed by air from air source 434, exhaust gases flow through the region 419 at the radial exterior of the end 430, following the wall of the conical portion 405, and flow through the body portion of the substrate 414 in a radially expanding direction. The exhaust gases pass out of the radially outer surface of the substrate body portion 415 and flow through the openings 412 in the cylindrical support 410, passing into the annular region 446 between the cylindrical support 410 and the inner surface of housing wall 402. The gasses then flow downstream of the substrate 414 and into the annular region 448 radially exterior of the air flow directing body 424. The exhaust gas flows through the vent holes 425 into the air flow directing body 424 and exit the converter 400 through outlet end 432.

The outlet end 432 of air flow directing body 434 is welded into an opening 438 of the bracket 442. The air source 434 is welded in an opening 460 in the wall of air flow directing body 424 and to a semi-cylindrical machined out slot 462 in bracket 442.

Figure 10:
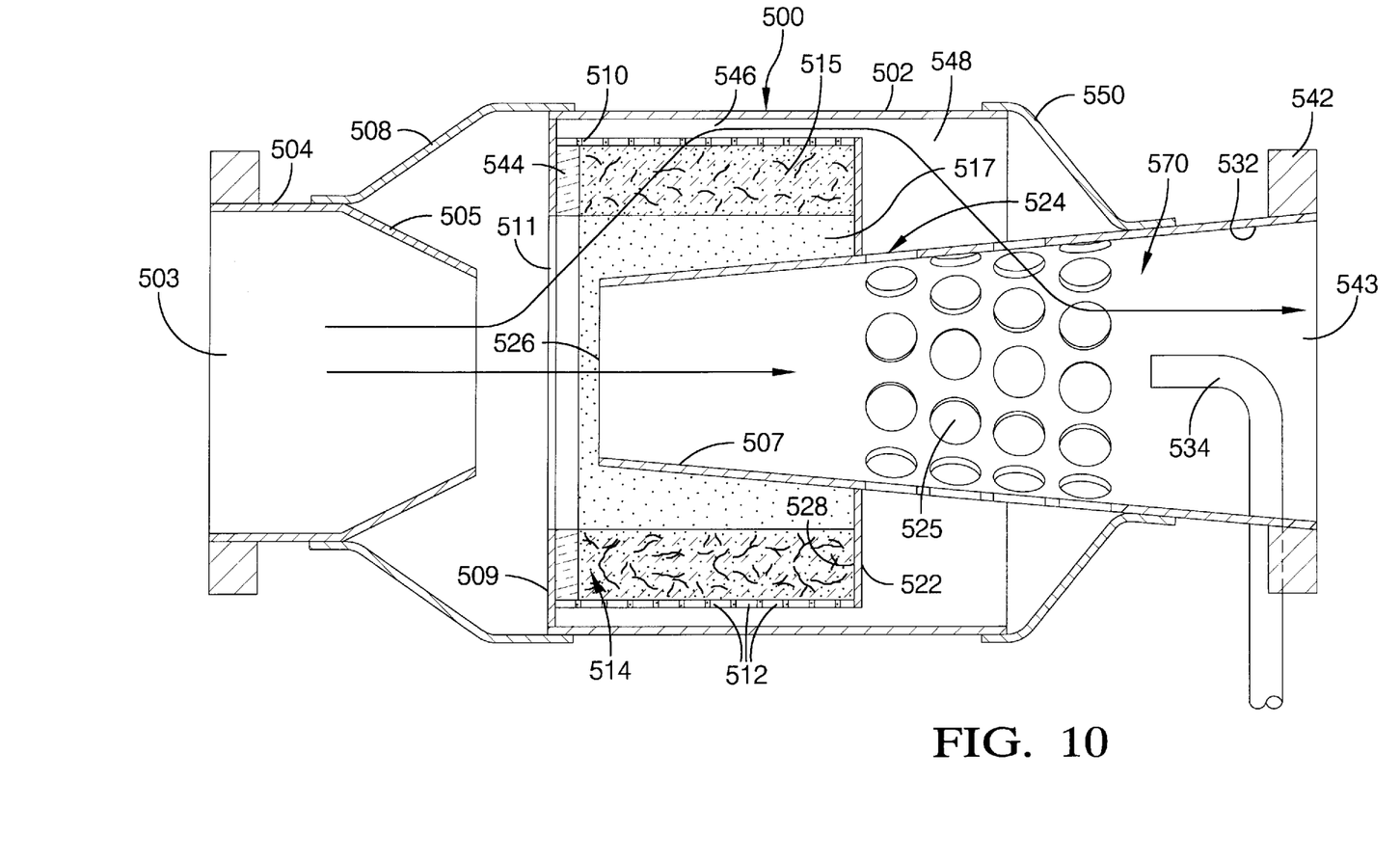

Referring now to FIG. 10, the example catalytic converter 500 shown includes the housing 502, inlet pipe 504 connected to the housing 502 vis-à-vis inlet cone 508 and an outlet tube 532 connected to the housing 502 vis-à-vis exit cone 550. In this example the air flow directing body 524 is divided into two parts, 505 and 507. Part 505 is formed as part of the inlet tube 504 and has a conical shaped portion (or alternatively a complex contraction forming a nozzle) decreasing in radius at the exhaust downstream end. The part 507 is a conically expanding tube that extends from the low pressure region 526 to the mounting plate 542 mounted to the outlet tube 532 of the part 507. An annular plate 509 is welded to the upstream end of the housing body 502 and defines an interior opening 511.

The substrate 514 has a body portion 515 and an air flow passage portion 517. An optional cylindrical support 510 is formed of perforated metal as in the above examples described with reference to FIGS. 8 and 9 and is welded to the annular support plate 509. At the other end of the substrate 514 a flat annular plate 522 has a radially outer periphery welded to the cylindrical support 510 and a radial inner periphery welded to the exterior of the part 507 of the air flow directing body 524. The substrate 514 is maintained in place by the cylindrical support 510 and abuts the inner surface 528 of end plate 522. A matting material 544 is located between the substrate body portion 515 and support plate 509. Or in the case of metal substrate, brazing directly to the end plate may be used to retain the metal substrate.

As in the above examples, catalytic converter 500 has two primary states of operation. In the first primary state, the air valve 570 is valved open allowing exhaust gas to flow through the bypass passage at the radial interior of part 507 from the inlet 503 to the outlet 543.

In the second primary state, when valve 570 is valved closed, air forced through air source 534 blocks the radially interior passage of air flow directing body 524 at the low pressure region 526, forcing exhaust gases entering the inlet 503 of the catalytic converter 500 to flow radially outwardly between the axially spaced separated pieces or parts 505 and 507 of the air flow directing body 524. The exhaust gases enter passage 517 radially exterior of the part 507 of air flow directing body 524 and flow in a radially expanding direction through the substrate body portion 515 exiting the radially exterior surface of the substrate body portion 515 and passing through the holes 512 of the cylindrical support 510. The exhaust gases next flow through the region 546 radially exterior of the cylindrical support 510 and radially interior of the housing 502 and to the annular region 548 radially exterior of the part 507. The gasses pass through the holes 525 to the interior of the tube 507 and exit the converter 500 via the outlet 543 to an exhaust flow pipe or downstream catalytic converter mounted to mounting plate 542.

Figure 11:
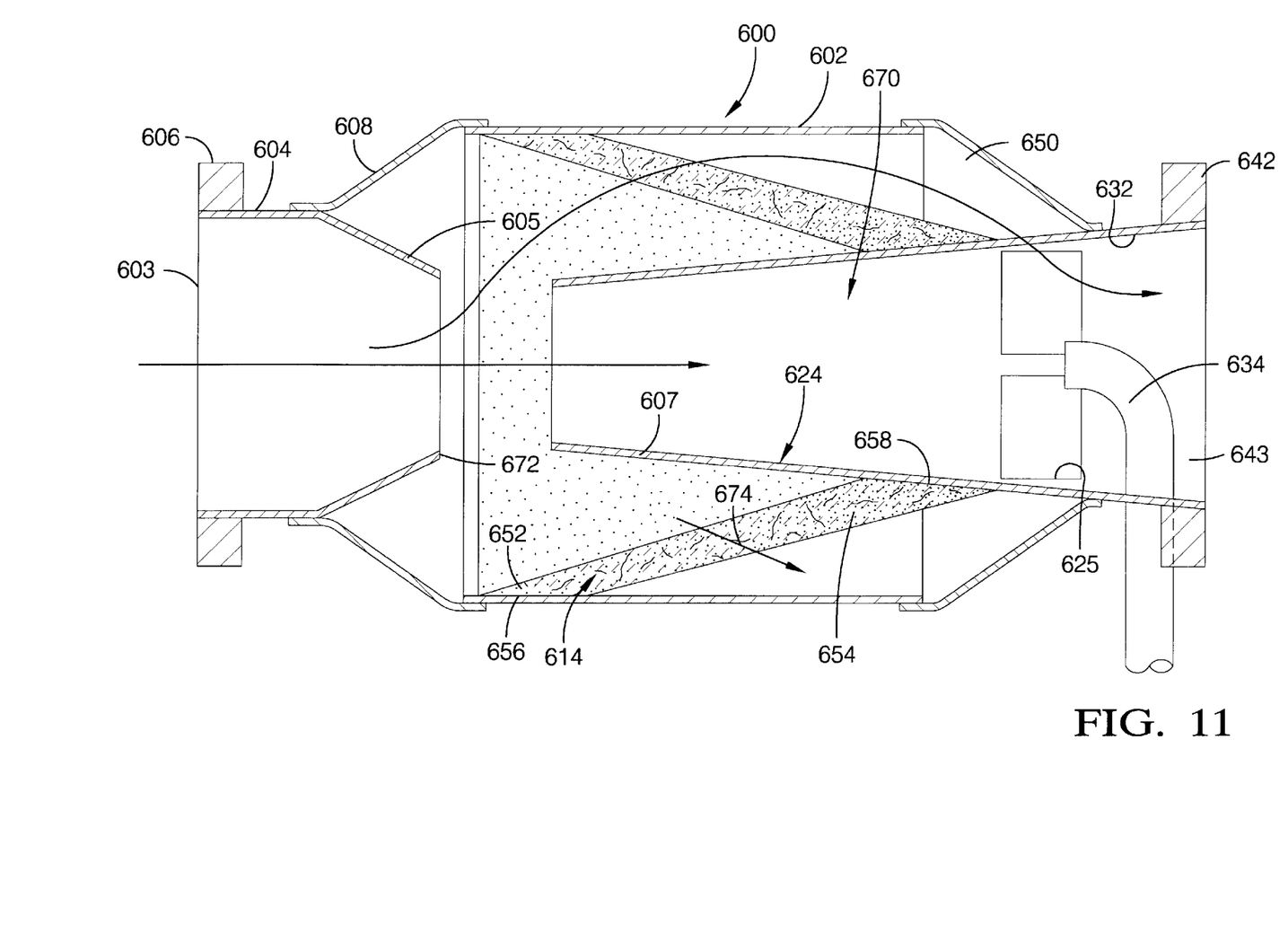

Referring now to FIG. 11, the catalytic converter 600 shown has a housing 602, inlet and outlet cones 608 and 650 and inlet and outlet tubes 604 and 632 with brackets 606 and 642, similar to the catalytic converter 500 shown in FIG. 10. Catalytic converter 600 differs from catalytic converter 500 shown in FIG. 10 in that the substrate 614 is a metal foam substrate having a conical cylindrical shape with a cross section as shown. The end 652 of the substrate 614 has the larger diameter and is placed at the exhaust gas upstream position and the end 654 has the smaller diameter and is placed at the exhaust gas downstream position.

The end 652 has a radially outer surface 656 forming a cylindrical shape parallel to the cylindrical shape of the inner surface of the housing 602 and is brazed, welded, diffusion bonded or sintered in place to the housing 602. Similarly, the end 654 of the substrate 614 has an inner cylindrical surface 658 parallel to the outer cylindrical surface of the cone shaped tube 607. The surface 658 is placed in tight contact with the outer surface of the cone 607 and is also brazed, welded, diffusion bonded or sintered in place. Because the metal foam substrates have an inherent ductility, vibration between the cone shaped tube 607 and the housing 602 will not damage the substrate 614.

When the valve 670 is valved closed by air forced through air source 634, exhaust gases entering inlet 603 travel radially outward through the axial opening 672 between conical section 605 of inlet tube 604 and cone shaped tube 607, which together comprise the air flow directing body 624. The flow passages through the substrate 614 are preferably oriented so that they have both an axial and a radially expanding direction exemplified by arrow 674. Once through the substrate 614, the exhaust gases re-enter the tube 607 through the vents 625 and exit the catalytic converter 600 through outlet 643.

In an alternative to the structures shown in FIGS. 8, 9, 10 and 11, the air flow directing bodies, supports, substrates, and air flow tubes may be placed into a common housing with a downstream catalyst substrate. Modification of the structures shown necessary to achieve that alternative arrangement can be easily implemented by those skilled in the art.

In an example where upstream substrate has axial flow paths through the body portion thereof, benefits have been found to sizing the entrance to the bypass passage at approximately the same as the inlet diameter of the converter housing.

We claim:

1. An exhaust gas management apparatus comprising:

a first substrate coated with a first oxidizing catalyst, wherein the first substrate includes a bypass passage therethrough, wherein the bypass passage includes an axial opening extending along an axial direction through the first substrate, and wherein the first substrate includes a body portion radially exterior of the axial opening;

an air source located downstream in an exhaust flow path of the axial opening;

a controllable air pump unit forcing secondary air through the air source wherein, during an activation of the controllable air pump unit, the bypass passage is valved shut by the secondary air flowing out of the air source and blocking the bypass passage; and a second substrate coated with a second oxidizing catalyst located in the path of exhaust downstream of the first substrate wherein the bypass passage also includes an air flow directing body including an inlet end and an outlet end and defining a region located between the inlet end and the outlet end and having a first diameter smaller than second and third diameters of the inlet and outlet ends, respectively, wherein the air flow directing body is mounted proximate the axial opening, wherein during the activation of the controllable air pump unit, the bypass passage is valved shut at the region having the first diameter, wherein a first air flow rate of the secondary air forced through the air source is required to valve shut the bypass passage at the region having the first diameter, wherein the first air flow rate is less than a second air flow rate that would be required to valve shut the bypass passage at a location within the bypass passage other than the region having the first diameter.

2. An exhaust gas management apparatus according to claim 1, also comprising:

an electronic control unit coupled to the controllable air pump unit, wherein the electronic control unit provides an output signal for controlling the controllable air pump unit, wherein the electronic control unit selectively controls the controllable air pump unit between first, second, third and fourth states, wherein in the first state the bypass passage is valved shut, in the second state the bypass passage is valved shut and at least some of the secondary air from the air source is forced upstream through the bypass passage and through the body portion of the first substrate, in the third state the bypass passage is valved open and the secondary air from the air source flows to the second substrate coated with the second oxidizing catalyst located downstream in the exhaust flow path of the first substrate and in the fourth state substantially none of the secondary air exits the air source.

3. An exhaust gas management system according to claim 1, also comprising:
   a housing, wherein the first and second substrates are located in the housing.

4. An exhaust gas management apparatus according to claim 1, wherein the first and second substrates are located in separate first and second housings.

5. An exhaust gas management apparatus according to claim 3, wherein the air source is located between the first and second substrates.

6. An exhaust gas management apparatus according to claim 1, wherein the air flow directing body is located substantially within the axial opening.

7. An exhaust gas management apparatus according to claim 1, wherein the first substrate includes a downstream axial end and wherein the air flow directing body inlet end is proximate to the downstream axial end of the first substrate.

8. An exhaust gas management apparatus according to claim 1, also comprising
   a housing in which the first substrate is located;
   an annular end plate proximate to a housing inlet end of the housing, wherein the annular end plate has an interior annular surface; and
   a cylindrical support surrounding the first substrate, wherein the cylindrical support has an axial end affixed to the interior annular surface,
   wherein the air flow directing body includes an annular surface (328) affixed to the inlet end of the air flow directing body, wherein the annular surface extends radially exterior of the inlet end of the air flow directing body and is attached to an end (356) of the cylindrical support distal from the annular end plate (308), wherein the first substrate is located between the annular surface and the annular end plate.

9. An exhaust gas management apparatus according to claim 8, also comprising
   a matting material (344) located between an axial end (343) of the first substrate and the annular end plate (308).

10. An exhaust gas management apparatus according to claim 1, wherein
    the region having the first diameter is within the axial opening of the first substrate.

11. An exhaust gas management apparatus according to claim 10, also comprising a housing within which the first substrate is located, wherein the housing and the air flow directing body form first and second flow paths, the first flow path comprising the bypass passage through a radial interior of the air flow directing body and the second flow path comprising an annular passage between an exterior of the inlet end of the air flow directing body and the body portion of the first substrate.

12. An exhaust gas management apparatus according to claim 10, also comprising
    a housing within which the first substrate is located;
    an annular end plate proximate to a housing inlet end of the housing, wherein the annular end plate has an interior annular surface; and
    a cylindrical support surrounding the first substrate, wherein the cylindrical support has an axial end affixed to the interior annular surface,
    an annular support plate (422) having a radially exterior surface affixed to an end of the cylindrical support (410) distal from the end plate (408) and a radially interior surface affixed to an outer periphery of the air flow directing body.

13. An exhaust gas management apparatus according to claim 12, wherein the air flow directing body includes a plurality of vent holes located axially between the annular support plate and an outlet end of the housing.

14. An exhaust gas management apparatus according to claim 10, wherein the air flow directing body comprises first and second axially spaced apart members.

15. An exhaust gas management apparatus according to claim 14, wherein when the bypass passage is valved shut, exhaust gas flows from a radial interior of the first member to a radial exterior of the second member where said members are axially spaced apart.

* * * * *